United States Patent
Ezaka (10) Patent No.: US 8,714,627 B2
(45) Date of Patent: May 6, 2014

(54) SPOILER

(75) Inventor: Hideki Ezaka, Aichi (JP)

(73) Assignee: Inoac Corporation, Aichi (JP)

( * ) Notice: Subject to any disclaimer, the term of this patent is extended or adjusted under 35 U.S.C. 154(b) by 20 days.

(21) Appl. No.: 13/228,692

(22) Filed: Sep. 9, 2011

(65) Prior Publication Data

US 2012/0061992 A1  Mar. 15, 2012

(30) Foreign Application Priority Data

Sep. 14, 2010  (JP) ................................. 2010-206051

(51) Int. Cl.
*B62D 35/00*  (2006.01)

(52) U.S. Cl.
USPC ....................................................... 296/180.1

(58) Field of Classification Search
USPC ....................................................... 296/180.1
See application file for complete search history.

(56) References Cited

U.S. PATENT DOCUMENTS 7,216,922 B2 * 5/2007 Tuohimaa et al. .......... 296/180.1
2009/0108142 A1 * 4/2009 Wright et al. ................ 244/215

FOREIGN PATENT DOCUMENTS

JP  2001-260230 A  9/2001

* cited by examiner

*Primary Examiner* — Glenn Dayoan
*Assistant Examiner* — Melissa A Black
(74) *Attorney, Agent, or Firm* — Sughrue Mion, PLLC (57) ABSTRACT

A spoiler includes an outer member and an inner member. The outer member includes a base plate portion, a cover plate portion facing the base plate portion, and a bent portion connecting the base plate portion and the cover plate portion. The inner member is arranged between the base plate portion and the cover plate portion. The inner member includes a back plate portion facing the base plate portion, and a wall portion extending from the back plate portion toward the cover plate portion. The base plate portion and the back plate portion are vibration-welded, and the cover plate portion and the wall portion are vibration-welded. The wall portion includes a plurality of grooves forming a corrugated structure in a cross section taken along a plane perpendicular to a direction in which the wall portion extends from the back plate portion toward the cover plate portion.

11 Claims, 6 Drawing Sheets

SPOILER

CROSS-REFERENCE TO RELATED APPLICATION

The present application claims priority from Japanese Patent Application No. 2010-206051 filed on Sep. 14, 2010, the entire content of which is incorporated herein by reference.

FIELD OF INVENTION

The present invention relates to a spoiler configured to be mounted on a vehicle.

DESCRIPTION OF RELATED ART

Figure 5:
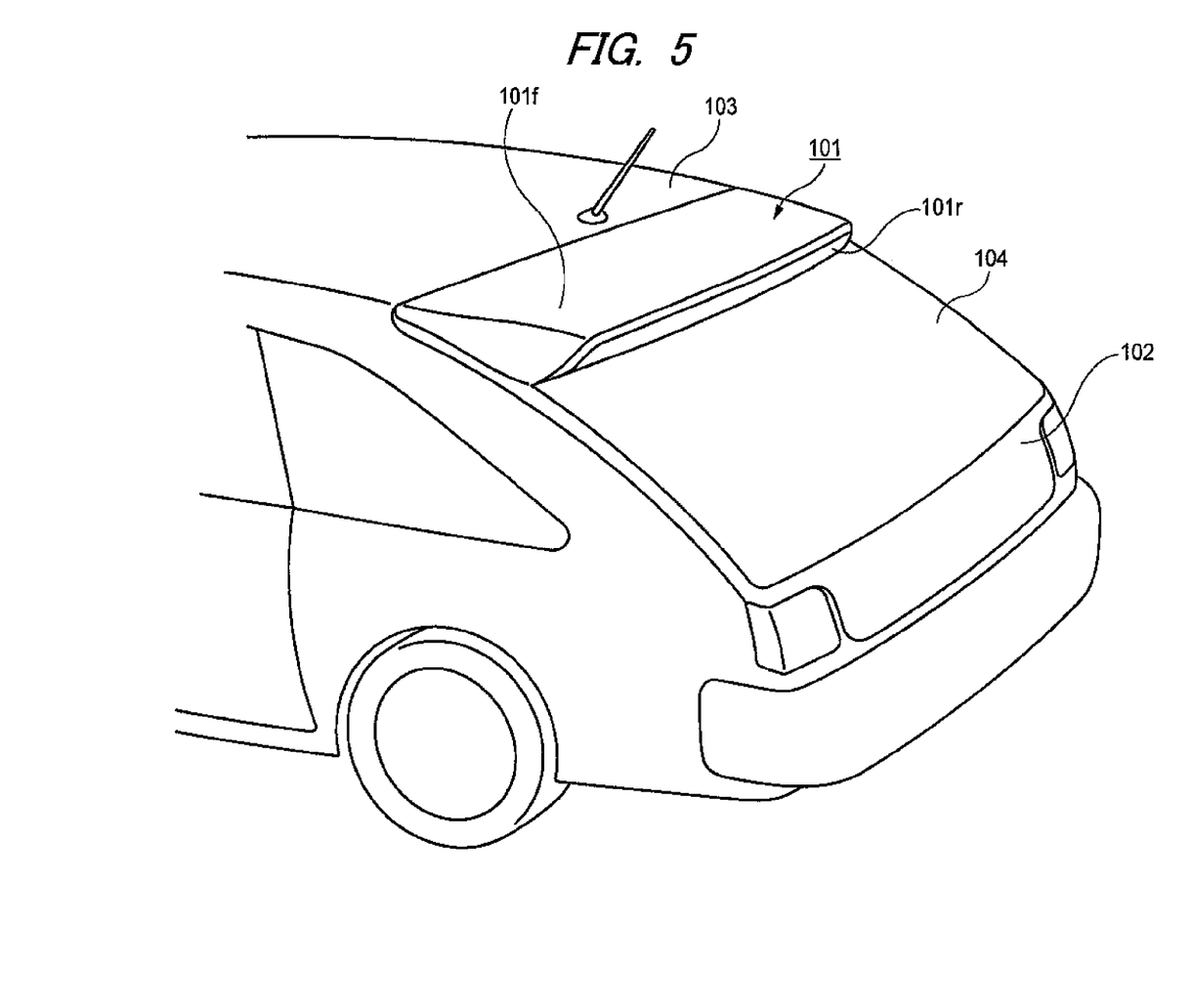
FIG. 5 is a diagram illustrating an example of how a related art spoiler is attached to a vehicle.
Figure 6:
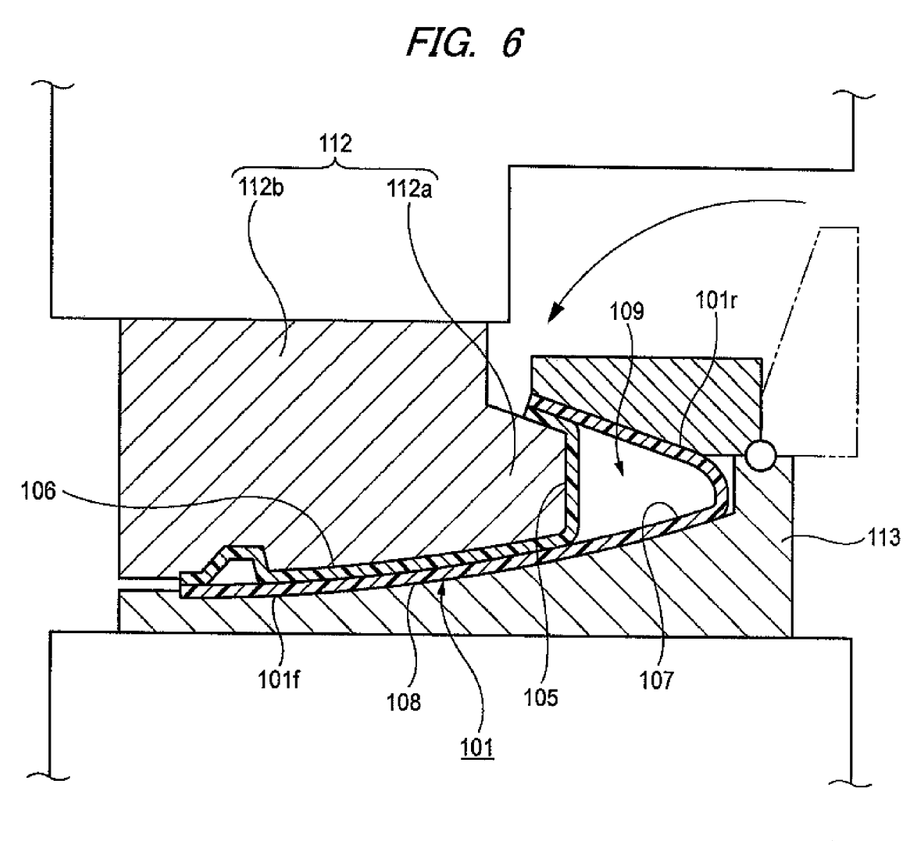
FIG. 6 is a cross-sectional view of the related art spoiler.

A spoiler is attached to a vehicle to improve a running stability of the vehicle by generating a downforce while the vehicle is traveling. FIG. 5 shows a related art spoiler 101. The spoiler 101 is a tailgate spoiler, and is attached to an upper end of a tailgate 102. A front portion 101f of the spoiler 101 has a surface continuing from a top surface of a roof 103 of a vehicle. A rear portion 101r of the spoiler 101 protrudes like an awning from a rear window 104 of the vehicle, and has an undercut cross-sectional shape as shown in FIG. 6. FIG. 6 shows the spoiler 101 in an upside down manner. The spoiler 101 includes an inner member 106 and an outer member 108. The inner member 106 includes a U-section portion 105 having opposed inner surfaces. The outer member 108 includes a V-section portion 107 having opposed inner surfaces between which the U-section portion 105 of the inner member 106 is fitted. The inner member 106 and the outer member 108 are joined to each other by a vibration welding such that a hollow closed section 109 is formed in the rear portion 101r of the spoiler 101 (see, e.g., JP 2001-260230 A).

To manufacture the spoiler 101, first, the inner member 106 and the outer member 108 are temporarily attached together, and are mounted on an upper jig 112 in an upside down manner as shown in FIG. 6. The upper jig 112 includes a portion 112a supporting the opposed inner surfaces of the U-section portion 105 of the inner member 106, and a portion 112b supporting the front portion 101f.

Next, in a state in which the spoiler 101 is fitted on the upper jig 112, a lower jig 113 is moved up and is pressed onto a downwardly facing surface of the spoiler 101. In this state, a relative vibration is applied between the upper jig 112 and the lower jig 113 and in a horizontal direction so that the inner member 106 and the outer member 108 slide relative to each other by a distance corresponding to amplitude of the vibration. Due to the frictional heat, a trapezoidal rib extending in a vibration direction is melted, and when the rib is melted by a certain amount, the vibration is stopped and the melted portion is cooled. When the melted portion is cooled and solidified such that the inner member 106 and the outer member 108 are fused, the upper jig 112 and the lower jig 113 are separated away from the spoiler 101, and the spoiler 101 is taken out.

According to the method described above, the spoiler 101 can be manufactured by fusing the materials by a vibration welding even when the materials have a relatively complicated cross-section having a portion bent in a U shape or a V shape.

However, in the method described above, the temporarily assembled spoiler 101 is attached to the upper jig 112 such that the portion 112a of the upper jig 112 is fitted into the U-section portion 105 of the inner member 106. This requires burdensome work such as lifting up the spoiler 101 to attach the spoiler 101 onto the upper jig 112, and an elastic deformation of the spoiler 101 when attaching and detaching the spoiler 101 with respect to the upper jig 112. Further, because the detachment of the spoiler 101 from the upper jig 112 is accompanied by deformation of the spoiler 101, there is a restraint on a design of the spoiler due to the consideration on a direction in which the spoiler 101 is to be detached from the upper jig 112.

BRIEF SUMMARY

Illustrative aspects of the present invention provide a spoiler that is free from burdensome attachement and detachment of a workpiece with respect to a jig when manufacturing the spoiler.

According to an illustrative aspect of the present invention, a spoiler includes an outer member and an inner member. The outer member includes a base plate portion, a cover plate portion facing the base plate portion, and a bent portion connecting the base plate portion and the cover plate portion. The inner member is arranged between the base plate portion and the cover plate portion. The inner member includes a back plate portion facing the base plate portion, and a wall portion extending from the back plate portion toward the cover plate portion. The base plate portion and the back plate portion are vibration-welded, and the cover plate portion and the wall portion are vibration-welded. The wall portion includes a plurality of grooves forming a corrugated structure in a cross section taken along a plane perpendicular to a direction in which the wall portion extends from the back plate portion toward the cover plate portion.

Other aspects and advantages of the present invention will be apparent from the following description, the claims, and the drawings.

DETAILED DESCRIPTION

Hereinafter, an exemplary embodiment of the present invention will be described in detail with reference to the drawings. The exemplary embodiment does not limit the scope of the present invention.

Figure 1:
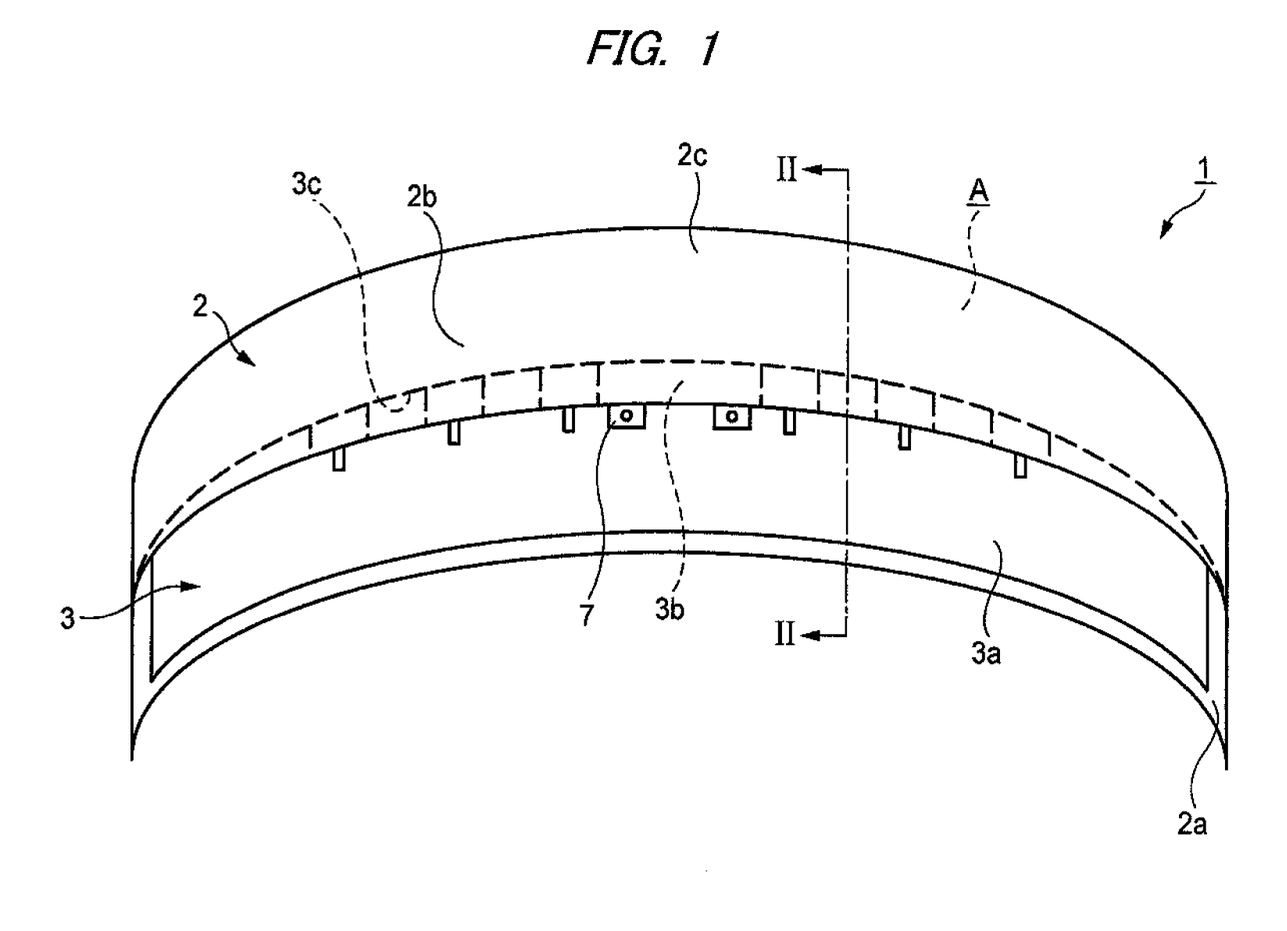
FIG. 1 is a bottom view of a spoiler according to an exemplary embodiment of the present invention.
Figure 2:
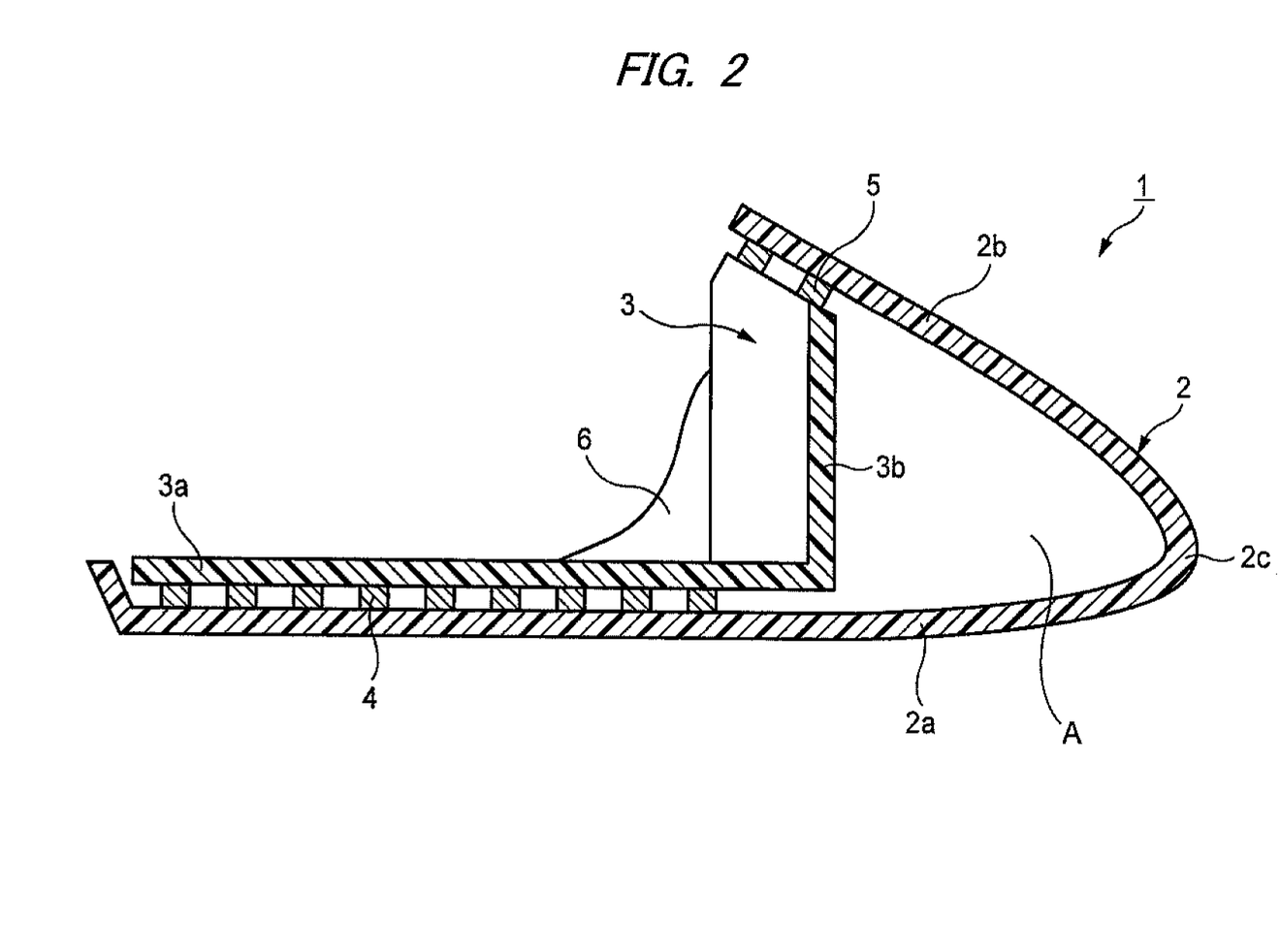
FIG. 2 is a cross-sectional view taken along the line II-II of FIG. 1.

A spoiler 1 shown in FIG. 1 is a wing-shaped rear spoiler 1 configured to be attached to a rear portion of a vehicle such that the spoiler 1 extends in a vehicle width direction. As shown in FIGS. 1 and 2, the rear spoiler 1 includes an outer member 2 and an inner member 3. The outer member 2 is bent such that the outer member 2 has a V-shaped cross section. The inner member 3 has an L-shaped cross section, and is fitted into the curved outer member 2. The outer member 2 and the inner member 3 are vibration-welded to each other via first welding protrusions 4 and second welding protrusions 5.

As shown in FIG. 2, the outer member 2 is a resin molded member having a one-piece structure. The outer member 2 includes a design plate portion 2a (a base plate portion), an inclined plate portion 2b (a cover plate portion) extending to opposed to the design plate portion 2a, and a bent portion 2c connecting the design plate portion 2a and the inclined plate portion 2b. The design plate portion has a design surface that forms a top surface of the spoiler 1 when mounted on a vehicle body. The inclined plate portion 2b is formed such that the inclined plate portion 2b is turned back from the bent portion 2c toward the design plate portion 2a so as to face the design plate portion 2a. In FIG. 2, the design plate portion 2a is positioned below the inclined plate portion 2b. However, when the spoiler 1 is attached to the vehicle body, the design plate portion 2a is positioned above the inclined plate portion 2b. Further, when the spoiler 1 is attached to the vehicle body, the length of the design plate portion 2a is longer than the length of the inclined plate portion 2b in a front-rear direction of the vehicle, i.e., in a direction perpendicular to the vehicle width direction, so that a space between the design plate portion 2a and the inclined plate portion 2b is opened toward the front of the vehicle.

The inner member 3 is a resin molded member having a one-piece structure. The inner member 3 has a back plate portion 3a facing the design plate portion 2a, and a wall portion 3b extending substantially upright from the back plate portion. The inner member 3 is welded to the outer member 2 such that the wall portion 3b is fitted into the outer member 2 from the opening at the space between the design plate portion 2a and the inclined plate portion 2b. A hollow space A is formed between the wall portion 3b and the bent portion 2c, so that the rear spoiler 1 has a hollow structure to reduce weight.

The first welding protrusions 4 are resin protrusions, and are formed on a surface of the back plate portion 3a of the inner member 3 that faces the design plate portion 2a of the outer member 2. The back plate portion 3a of the inner member 3 is vibration-welded to the design plate portion 2a of the outer member 2 via the first welding protrusions 4. The second welding protrusions 5 are resin protrusions, and are formed on a surface 3d of the wall portion 3b of the inner member 3 that faces the inclined plate portion 2b of the outer member 2. The wall portion 3b of the inner member 3 is vibration-welded to the inclined plate portion 2b of the outer member 2 via the second welding protrusions 5. The first welding protrusions 4 and the second welding protrusions 5 extend in their respective welding directions. More specifically, and the welding direction of the first welding protrusions 4 is substantially perpendicular to the design plate portion 2a, and the welding direction of the second welding protrusions 5 is substantially perpendicular to the inclined plate portion 2b. The welding direction of the first welding protrusions 4 and the welding direction of the second welding protrusions 5 intersect with each other.

The area where the first welding protrusions 4 are formed on the surface of the back plate portion 3a of the inner member 3 that faces the design plate portion 2a of the outer member 2 is not limited in particular. However, when the first welding protrusions 4 are provided in the area closer to the front of the vehicle when mounted on the vehicle, i.e. the area closer to the left in FIG. 2, it is advantageous in that the pressing force during the vibration welding is efficiently applied.

The area where the second welding protrusions 5 are formed on the surface 3d of the inner member 3 below the inclined plate portion 2b is likewise not limited in particular. When a stop lamp is attached to a stop lamp mounting portion 7 of the rear spoiler 1 near the wall portion 3b, the second welding protrusions 5 are provided to avoid the stop lamp mounting portion 7. Further, when a bracket for mounting the rear spoiler 1 to the vehicle body is fastened at an attaching portion of the rear spoiler 1 near the wall portion 3b, the second welding protrusions 5 are provided to avoid the attaching portion.

The first welding protrusions 4 and the second welding protrusions 5 are resin protrusions, and are portions of the inner member 3 where the thickness of the inner member 3 is partially increased. Thus, a sink mark may be formed as a result of injection-molding of the inner member 3. In contrast to the exemplary embodiment, when the first welding protrusions 4 and the second welding protrusions 5 are formed on the outer member 2, a sink mark may be formed on the design surface of the outer member 2 where it is exposed to the outside and a design is required. Therefore, according the exemplary embodiment, the first welding protrusions 4 and the second welding protrusions 5 are formed on the inner member 3 so as not to affect the outer appearance of the spoiler 1.

Figure 3:
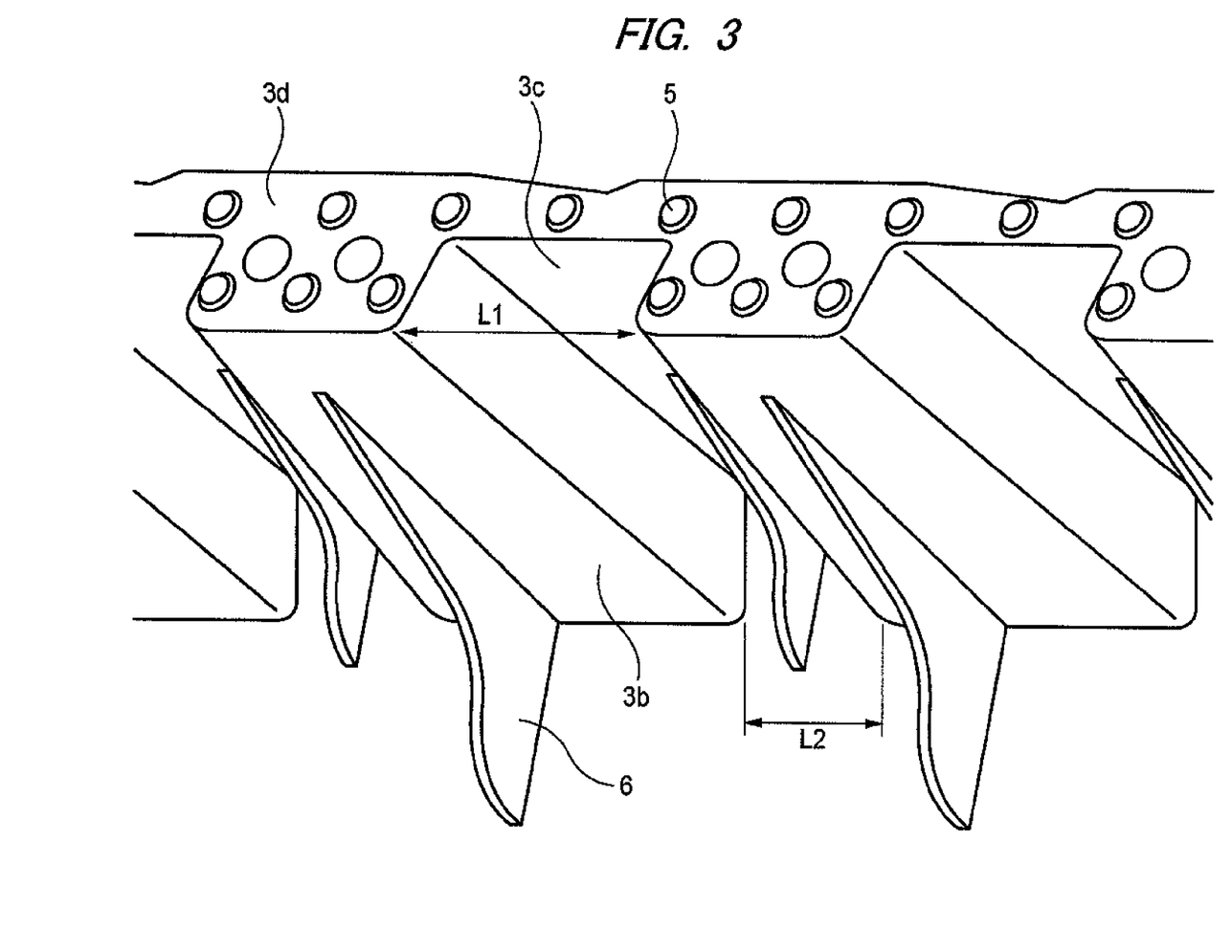
FIG. 3 is an enlarged perspective view of a wall portion of an inner member of the spoiler.

FIG. 3 is an enlarged perspective view of the wall portion 3b of the inner member 3. As shown in FIG. 3, the wall portion 3b has a corrugated structure in the longitudinal direction of the inner member 3, i.e. in the vehicle width, direction when mounted on the vehicle. More specifically, a plurality of grooves 3c, each being concave toward the bent portion 2c of the outer member 2, are arranged in the longitudinal direction of the wall portion 3b to form the corrugated structure of the wall portion 3b. Accordingly, the wall portion 3b has the corrugated structure in a cross section taken along a plane perpendicular to the direction in which the wall portion 3b extends upright. Therefore, when a pressing force is applied from the direction in which the wall portion 3b extends upright, due to its large second moment of area, the pressing force can be supported without buckling.

The cross section of the wall portion 3b need not be in a corrugated form along the entire wall portion 3b, as long as the strength of the wall portion 3b is ensured to support the pressing force that is applied during the vibration welding described below. In the exemplary embodiment, in the vehicle width direction, the corrugated structure is provided on respective sides of the stop lamp mounting portion 7. The stop lamp mounting portion 7 is provided in the middle in the vehicle width direction, and does not have a corrugated structure.

Each of the grooves 3c of the wall portion 3b is formed such that the width L1 of the groove 3c at a distal end of the wall portion 3b, i.e. the end on the inclined plate portion 2h, is larger than the width L2 of the groove 3c at a base end of the wall portion 3b, i.e. the end near the design plate portion 2a. More specifically, each of the grooves 3c is formed such that the width of each of the grooves 3c is widened toward the distal end, i.e., toward the inclined plate portion 2b. This is advantages in that it becomes easier to remove the mold from the inner member 3 after the injection molding of the inner member 3.

In the exemplary embodiment, in order to further improve rigidity in the welding-direction, a plurality of reinforcement ribs 6 are provided on a side surface of the wall portion 3b opposite to the bent portion 2c. The reinforcement ribs 6 are formed on a side surface of the wall portion 3b extending from the wall portion 3b in a direction away from the bent portion 2c and so as to be perpendicular to the inclined plate portion 2b.

Figure 4:
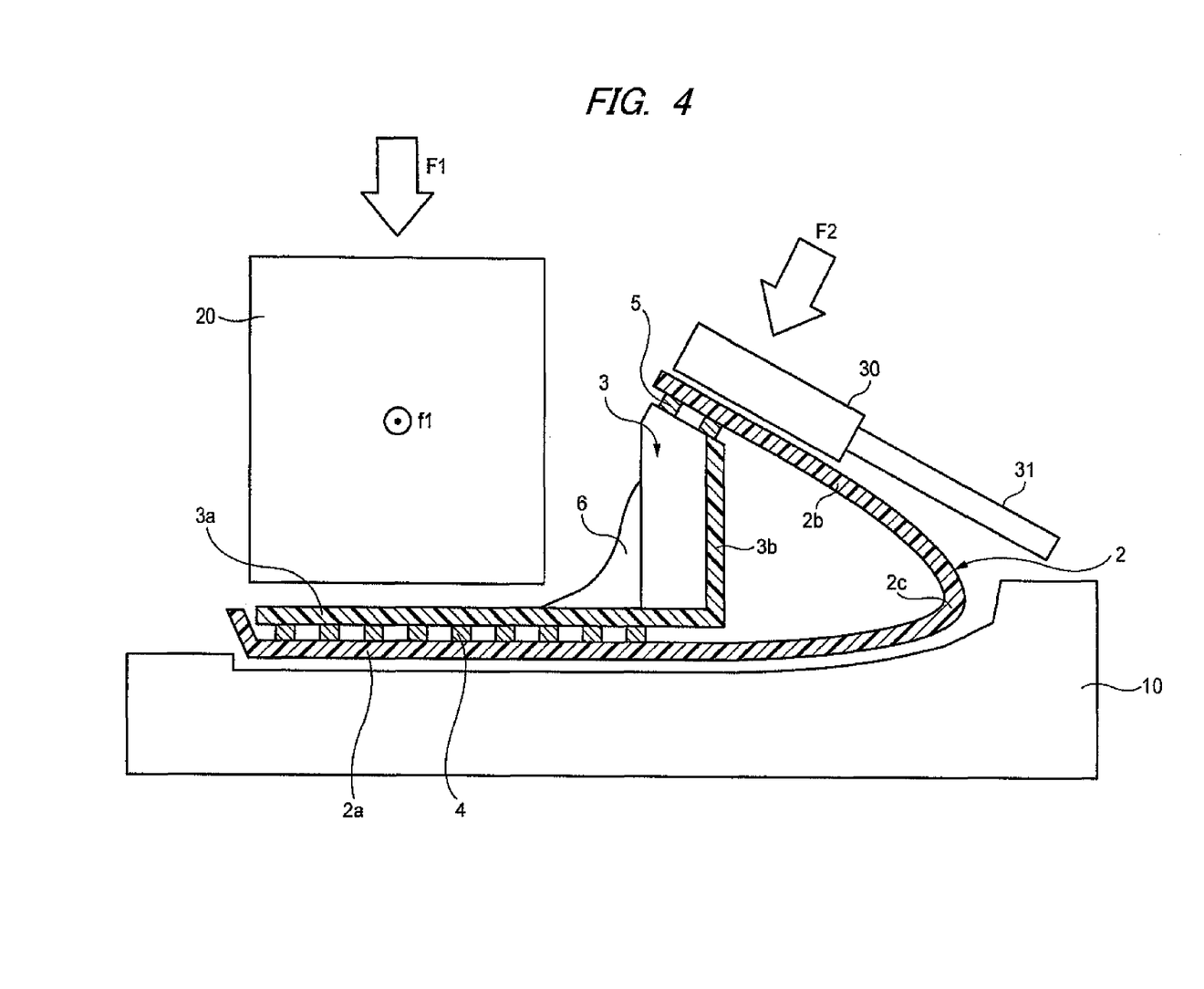
FIG. 4 is a cross-sectional view illustrating how the spoiler is manufactured.

To manufacture the rear spoiler 1, the outer member 2 and the inner member 3 are welded by a vibration welding apparatus including a lower jig 10, a first upper jig 20, and a second upper jig 30 as shown in FIG. 4. A vibration welding is a joining method in which friction heat is generated by rubbing contact surfaces of members to be welded by vibrating one of the members in a direction intersecting a direction in which the members are being pressed, so that the contact surfaces are melted and the members are fused.

The vibration welding apparatus includes the lower jig 10 configured to support the design plate portion 2a of the outer member 2, the first upper jig 20 configured to press the back plate portion 3a of the inner member Sand to apply vibration to the inner member 3, and the second upper jig 30 configured to press the inclined plate portion 2b of the outer member 2. The second upper jig 30 is slidably attached to the lower jig 10. Using the vibration welding apparatus, the rear spoiler 1 is assembled in a manner described below.

First, the outer member 2 and the inner member 3, each formed by injection molding, are temporarily coupled to each other. Then, the rear spoiler 1 is placed on the lower jig 10 such that the design surface of the design plate portion 2a of the outer member 2 contacts the lower jig 10. The first upper jig 20 is moved down to face the back plate portion 3a of the is inner member 3 so that the first upper jig 20 can apply a pressing force F1 to the first welding protrusions 4. The second upper jig 30 is moved to face the inclined plate portion 2b of the outer member 2 so that the second upper jig 30 can apply a pressing force F2 to the second welding protrusions 5. The second upper jig 30 is connected to a driving mechanism 31. The driving mechanism 31 is movable along the inclined plate portion 2b to slide the second upper jig 30 on the inclined plate portion 2b. In another example, the driving mechanism 31 may be configured to move to the second upper jig 30 toward the lower jig 10 in a direction of the pressing force F2.

When the outer member 2 and the inner member 3 are set in the vibration welding apparatus, and the first upper jig 20 and the second upper jig 30 are moved to be in their positions, the pressing force F1 is applied to the back plate portion 3a by the first upper jig 20 in a vertically downward direction in FIG. 4 to weld the design plate portion 2a and the back plate portion 3a. Further, the pressing force F2 is applied to the inclined plate portion 2b by the second upper jig 30 in an obliquely downward direction in FIG. 4 to weld the inclined plate portion 2b and the wall portion 3b. A vibratory force f1 is applied in a direction perpendicular to the drawing sheet in FIG. 4. The inner member 3 is vibrated in a horizontal direction by the vibratory force f1 of the first upper jig 20 with respect to the outer member 2 that is set in place by the lower jig 10 and the second upper jig 30 connected to the lower jig 10. The vibratory force f1 is then stopped when the first welding protrusions 4 and the second welding protrusions 5 are melted by certain amount, and subsequently, the first welding protrusions 4 and the second welding protrusions 5 are cooled and solidified, whereby the outer member 2 and the inner member 3 are joined.

During the vibration welding, the pressing force F1 from the first upper jig 20 acts on the back plate portion 3a, the first welding protrusions 4, and the design plate portion 2a, and is supported by the lower jig 10. The pressing force F2 from the second upper jig 30 acts on the inclined plate portion 2b, the second welding protrusions 5, and the wall portion 3b. Here, the cross section of the wall portion 3b taken along a plane perpendicular to the direction in which the wall portion 3b extends upright has a corrugated structure so that the rigidity of the wall portion 3b with respect to the direction of the pressing force F2 is high. Therefore, the wall portion 3b can reliably support the pressing force F2 without buckling.

That is, the wall portion 3b of the rear spoiler 1 supports the pressing force F2 by itself. Therefore, it is not necessary to support the pressing force F2 by placing the jig below the inclined plate portion 2b like in the related art. Accordingly, the temporarily assembled rear spoiler 1, i.e. the outer member 2 and the inner member 3a, can be simply be set inside the vibration welding apparatus on the lower jig. The first upper jig 20 is moved only linearly, without the need to fit a portion of the jig into a bent portion of an inner member. Therefore, attaching and detaching movement of a workpiece with respect to the jig is linear and simplified.

Further, it is not necessary to lift the outer member 2 and the inner member 3 up to set onto the upper jig, and the temporarily coupled outer member 2 and the inner member 3 are simply placed on the lower jig 10. Thus, the operational safety and the working efficiency are improved. As a result, the manufacturing efficiency is improved, and the rear spoiler can be provided at a lower cost.

While the rear spoiler 1 is attached to the tailgate in the exemplary embodiment described above, the rear spoiler 1 may be attached to a rear portion of a roof or a trunk lid of a vehicle. Moreover, the present invention can be applied to other types of spoiler such as, for example, a wing-type spoiler. Further, while the welding directions of the first welding protrusions 4 and the second welding protrusions 5 intersect each other in the exemplary embodiment described above, the present invention can be applied to a spoiler having a structure in which the design plate portion 2a and the cover plate portion 2b are parallel, and the welding directions of the first welding protrusions 4 and the second welding protrusions 5 are parallel.

What is claimed is:

1. A spoiler comprising:
   an outer member comprising a base plate portion, a cover plate portion facing the base plate portion, and a bent portion connecting the base plate portion and the cover plate portion; and
   an inner member arranged between the base plate portion and the cover plate portion, the inner member comprising a back plate portion facing the base plate portion, and a wall portion extending from the back plate portion toward the cover plate portion,
   wherein the base plate portion and the back plate portion are vibration-welded, and the cover plate portion and the wall portion are vibration-welded,
   wherein the wall portion comprises a plurality of grooves forming a corrugated structure in a cross section taken along a plane perpendicular to a direction in which the wall portion extends from the back plate portion toward the cover plate portion, and
   wherein each of the grooves is concave toward the bent portion.

2. The spoiler of claim 1, wherein the base plate portion comprises a design
   surface forming a top surface of the spoiler when the spoiler is mounted on a vehicle,
   wherein the back plate portion comprises a first welding protrusion via which the base plate portion and the back plate portion are vibration-welded, and
   wherein the wall portion comprises a second welding protrusion via which the cover plate portion and the wall portion are vibration-welded.

3. The spoiler according to claim 1, wherein a width of each of the grooves is widened toward the cover plate portion.

4. The spoiler according to claim 1, wherein the inner member further comprises a reinforcement rib extending from the wall portion in a direction opposite to the bent portion.

5. The spoiler according to claim 1, wherein each of the plurality of grooves extends in the direction in which the wall portion extends from the back plate portion toward the cover plate portion.

6. A spoiler comprising:
- an outer member comprising a base plate portion, a cover plate portion facing the base plate portion, and a bent portion connecting the base plate portion and the cover plate portion; and
- an inner member arranged between the base plate portion and the cover plate portion, the inner member comprising a back plate portion facing the base plate portion, and a wall portion extending from the back plate portion toward the cover plate portion,
- wherein the base plate portion and the back plate portion are vibration-welded, and the cover plate portion and the wall portion are vibration-welded,
- wherein the wall portion comprises a plurality of grooves forming a corrugated structure in a cross section taken along a plane perpendicular to a direction in which the wall portion extends from the back plate portion toward the cover plate portion, and
- wherein a width of each of the grooves is widened toward the cover plate portion.

7. The spoiler according to claim 6, wherein the base plate portion comprises a design surface forming a top surface of the spoiler when the spoiler is mounted on a vehicle,
- wherein the back plate portion comprises a first welding protrusion via which the base plate portion and the back plate portion are vibration-welded, and
- wherein the wall portion comprises a second welding protrusion via which the cover plate portion and the wall portion are vibration-welded.

8. The spoiler according to claim 6, wherein each of the plurality of grooves extends in the direction in which the wall portion extends from the back plate portion toward the cover plate portion.

9. A spoiler comprising:
- an outer member comprising a base plate portion, a cover plate portion facing the base plate portion, and a bent portion connecting the base plate portion and the cover plate portion; and
- an inner member arranged between the base plate portion and the cover plate portion, the inner member comprising a back plate portion facing the base plate portion, and a wall portion extending from the back plate portion toward the cover plate portion,
- wherein the base plate portion and the back plate portion are vibration-welded, and the cover plate portion and the wall portion are vibration-welded,
- wherein the wall portion comprises a plurality of grooves forming a corrugated structure in a cross section taken along a plane perpendicular to a direction in which the wall portion extends from the back plate portion toward the cover plate portion, and
- wherein the inner member further comprises a reinforcement rib extending from the wall portion in a direction opposite to the bent portion.

10. The spoiler according to claim 9, wherein the base plate portion comprises a design surface forming a top surface of the spoiler when the spoiler is mounted on a vehicle,
- wherein the back plate portion comprises a first welding protrusion via which the base plate portion and the back plate portion are vibration-welded, and
- wherein the wall portion comprises a second welding protrusion via which the cover plate portion and the wall portion are vibration-welded.

11. The spoiler according to claim 9, wherein each of the plurality of grooves extends in the direction in which the wall portion extends from the back plate portion toward the cover plate portion.

* * * * *